US011823590B2

(12) United States Patent
Wang et al.

(10) Patent No.: US 11,823,590 B2
(45) Date of Patent: Nov. 21, 2023

(54) NECK ASSEMBLY FOR ANTHROPOMORPHIC TEST DEVICE

(71) Applicant: Humanetics Innovative Solutions, Inc., Farmington Hills, MI (US)

(72) Inventors: Zhenwen J. Wang, Farmington Hills, MI (US); Joseph P. McInnis, New Hudson, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 610 days.

(21) Appl. No.: 16/914,297

(22) Filed: Jun. 27, 2020

(65) Prior Publication Data

US 2020/0410901 A1    Dec. 31, 2020

Related U.S. Application Data

(60) Provisional application No. 62/868,514, filed on Jun. 28, 2019.

(51) Int. Cl.
*G09B 23/32* (2006.01)
*G01M 17/007* (2006.01)

(52) U.S. Cl.
CPC ......... *G09B 23/32* (2013.01); *G01M 17/0078* (2013.01)

(58) Field of Classification Search
CPC ................................ G09B 23/30; G09B 23/32
(Continued)

(56) References Cited

U.S. PATENT DOCUMENTS 979,147 A     12/1910 Fryette
2,108,229 A    2/1938 Metz
(Continued)

FOREIGN PATENT DOCUMENTS

CN    202631257 U    12/2012
CN    103203754 A    7/2013
(Continued)

OTHER PUBLICATIONS

Computer-generated English language abstract for DE 102007062761 B4 extracted from espacenet.com database on Nov. 19, 2020, 3 pages.

(Continued)

*Primary Examiner* — Joseph B Baldori
(74) *Attorney, Agent, or Firm* — Howard & Howard Attorneys PLLC

(57) ABSTRACT

A neck assembly for an anthropomorphic test device includes a plurality of vertebra discs, a joint element disposed between each pair of vertebra discs, and a torsion assembly coupled to one vertebra disc to allow rotation about an axis of the vertebra discs to simulate torsion response of a human neck during an impact condition. The torsion assembly includes a neck interface plate mounted to an uppermost one vertebra disc with the plate having a plurality of spaced torsion stops. The torsion assembly also includes an upper member coupled to the plate and a resilient member having a plurality of projections positioned between the upper member and plate, with the resilient member engaging the upper member for at least partial concurrent movement during the rotation of the upper member relative to the plate wherein the projections bend in a direction responsive to a direction of rotation of the upper member.

27 Claims, 13 Drawing Sheets

(58) Field of Classification Search
USPC .................................................. 434/274, 275
See application file for complete search history.

(56) References Cited

U.S. PATENT DOCUMENTS

| | | | |
|---|---|---|---|
| 3,707,782 | A | 1/1973 | Alderson |
| 3,740,871 | A | 6/1973 | Berton et al. |
| 3,753,301 | A | 8/1973 | Daniel et al. |
| 3,754,338 | A | 8/1973 | Culver |
| 3,762,069 | A | 10/1973 | Culver |
| 3,877,156 | A | 4/1975 | Itoh |
| 3,895,451 | A | 7/1975 | Smrcka |
| 3,962,801 | A | 6/1976 | Gonzalez |
| 4,200,995 | A | 5/1980 | Trella |
| 4,261,113 | A | 4/1981 | Alderson |
| 4,488,433 | A | 12/1984 | Denton et al. |
| 4,872,841 | A | 10/1989 | Hamilton et al. |
| 4,948,373 | A | 8/1990 | Engels |
| 5,018,977 | A | 5/1991 | Wiley et al. |
| 5,152,692 | A | 10/1992 | Richards |
| 5,259,765 | A | 11/1993 | Richards |
| 5,317,931 | A | 6/1994 | Kalami |
| 5,526,707 | A | 6/1996 | Smrcka |
| 5,528,943 | A | 6/1996 | Smrcka et al. |
| 5,589,651 | A | 12/1996 | Viano et al. |
| 5,665,922 | A | 9/1997 | Tsukada et al. |
| 5,672,059 | A | 9/1997 | Browne-Wilkinson |
| 5,741,989 | A | 4/1998 | Viano et al. |
| 6,422,874 | B1 | 7/2002 | Green et al. |
| 6,439,070 | B1 | 8/2002 | Beebe et al. |
| 6,447,518 | B1 | 9/2002 | Krause et al. |
| 6,749,433 | B2 | 6/2004 | Kassai et al. |
| 6,982,409 | B2 | 1/2006 | Huang et al. |
| 7,086,273 | B2 | 8/2006 | Lipmyer |
| 7,508,530 | B1 | 3/2009 | Handman |
| 7,878,080 | B2 | 2/2011 | Hwang et al. |
| 7,942,676 | B2 | 5/2011 | Murdach |
| RE42,418 | E | 6/2011 | Lipmyer |
| 8,840,404 | B2 | 9/2014 | Arthur et al. |
| 9,011,158 | B2 | 4/2015 | Merkle et al. |
| 9,355,575 | B2 | 5/2016 | Wang |
| 9,972,220 | B2 | 5/2018 | Wang |
| 10,395,561 | B2 * | 8/2019 | Vara .......................... G09B 9/00 |
| 10,585,019 | B2 | 3/2020 | Wang et al. |
| 10,852,216 | B2 | 12/2020 | Wang et al. |
| 11,386,810 | B2 * | 7/2022 | Gocmen ................. G09B 23/28 |
| 2004/0029090 | A1 | 2/2004 | Kassai et al. |
| 2005/0126258 | A1 | 6/2005 | Lipmyer |
| 2009/0025492 | A1 | 1/2009 | Hwang et al. |
| 2013/0000426 | A1 | 1/2013 | Arthur et al. |
| 2013/0213155 | A1 | 8/2013 | Ozawa |
| 2013/0252220 | A1 | 9/2013 | Wang |
| 2013/0327164 | A1 | 12/2013 | Wang |
| 2014/0190279 | A1 | 7/2014 | Been et al. |
| 2014/0190280 | A1 | 7/2014 | Been et al. |
| 2014/0272881 | A1 | 9/2014 | Barsoum |
| 2014/0294485 | A1 | 10/2014 | McInnis et al. |
| 2015/0086957 | A1 | 3/2015 | Gibbs et al. |
| 2015/0369694 | A1 * | 12/2015 | Neale ....................... G01M 7/08 |
| | | | 73/12.01 |
| 2016/0189571 | A1 | 6/2016 | Wang |
| 2016/0293060 | A1 * | 10/2016 | Wang ..................... G09B 23/32 |
| 2017/0249870 | A1 * | 8/2017 | Shah ...................... G09B 23/32 |
| 2018/0136083 | A1 | 5/2018 | Wang et al. |
| 2022/0042880 | A1 * | 2/2022 | Wang ..................... G09B 23/34 |

FOREIGN PATENT DOCUMENTS

| | | |
|---|---|---|
| CN | 103926046 A | 7/2014 |
| CN | 105043707 A | 11/2015 |
| CN | 106217354 A | 12/2016 |
| CN | 106482964 A | 3/2017 |
| CN | 107607327 A | 1/2018 |
| DE | 2330093 A1 | 1/1973 |
| DE | 2330093 A1 | 1/1974 |
| DE | 4012691 A1 | 10/1990 |
| DE | 4117046 A1 | 11/1991 |
| DE | 10215640 A1 | 11/2003 |
| DE | 102004058022 A1 | 6/2005 |
| DE | 102004058022 B4 | 12/2007 |
| DE | 102007062761 B4 | 9/2013 |
| DE | 102013009815 A1 | 12/2013 |
| EP | 0709665 A2 | 5/1996 |
| EP | 1388833 B1 | 9/2009 |
| EP | 1388833 B8 | 11/2009 |
| EP | 3040961 A1 | 7/2016 |
| EP | 3392638 A1 | 10/2018 |
| FR | 1503956 A | 12/1967 |
| FR | 2018158 A1 | 5/1970 |
| FR | 2646266 A1 | 10/1990 |
| GB | 2231433 A | 11/1990 |
| GB | 2244843 A | 12/1991 |
| GB | 2231433 B | 5/1993 |
| GB | 2244843 B | 4/1994 |
| GB | 2344922 A | 6/2000 |
| JP | S50114835 U | 9/1975 |
| JP | S 50114835 U | 9/1975 |
| JP | 2005227266 A | 8/2005 |
| JP | 2012202708 A | 10/2012 |
| JP | 2013257322 A | 12/2013 |
| JP | 5664391 B2 | 2/2015 |
| KR | 20010103291 A | 11/2001 |
| RO | 129266 | 2/2014 |
| WO | 9830995 A1 | 7/1998 |
| WO | 9847122 A1 | 10/1998 |
| WO | 2012044225 A1 | 4/2012 |

OTHER PUBLICATIONS

Computer-generated English language abstract for DE 102013009815 A1 extracted from espacenet.com database on Nov. 19, 2020, 2 pages.
Computer-generated English language abstract for DE 4012691 A1 extracted from espacenet.com database on Nov. 19, 2020, 3 pages.
Computer-generated English language abstract for FR 2646266 A1 extracted from espacenet.com database on Nov. 19, 2020, 3 pages.
Computer-generated English language abstract for KR 2001-0103291 A from Google Translate on Nov. 16, 2020, 1 page.
English language abstract for CN 103203754 A extracted from espacenet.com database on Nov. 19, 2020, 1 page.
English language abstract for CN 103926046 A extracted from espacenet.com database on Nov. 19, 2020, 2 pages.
English language abstract for CN 105043707 A extracted from espacenet.com database on Nov. 19, 2020, 1 page.
English language abstract for CN 106217354 A extracted from espacenet.com database on Nov. 19, 2020, 2 pages.
English language abstract for DE 102004058022 A1 extracted from espacenet.com database on Nov. 19, 2020, 1 page.
English language abstract for DE 102004058022 B4 extracted from espacenet.com database on Nov. 19, 2020, 1 page.
English language abstract for DE 10215640 A1 extracted from espacenet.com database on Nov. 19, 2020, 1 page.
English language abstract for DE 2330093 A1 extracted from espacenet.com database on Nov. 19, 2020, 2 pages.
English language abstract for FR 2018158 A1 extracted from espacenet.com database on Nov. 19, 2020, 2 pages.
English language abstract for JP 2005227266 A extracted from espacenet.com database on Nov. 19, 2020, 1 page.
English language abstract for JP 2012202708 A extracted from espacenet.com database on Nov. 19, 2020, 1 page.
English language abstract for JP 5664391 B2 extracted from espacenet.com database on Nov. 19, 2020, 1 page.
English language abstract for JP2013257322 A extracted from espacenet.com database on Nov. 19, 2020, 1page.
English language abstract for JPS 50114835 U extracted from espacenet.com database on Nov. 19, 2020, 1 page.
English language abstract for RO 129266 A0 extracted from espacenet.com database on Nov. 19, 2020, 2 pages.

(56) References Cited

OTHER PUBLICATIONS

English language abstract not found for DE 4117046 A1; however, see English language equivalent GB 2244843 B. Original document extracted from espacenet.com database on Nov. 19, 2020, 26 pages.

European Search Report for Application EP 20 15 8194 dated Mar. 12, 2020, 2 pages.

European Search Report for Application EP 20 18 2905 dated Oct. 23, 2020, 2 pages.

European Search Report for Application No. EP 18167334.4; dated Jul. 19, 2018; 7 pages.

Huang et al., "Development of an Advanced Head/Neck System for 5th Percentile Female Anthropomorphic Test Dummies", Jan. 1, 2002, retrievedfrom the Internet: URL:http://www-nrd.nhtsa.dot.gov/pdf/bio/proceedings/2002_30/30-6.pdf, pp. 63-76.

Machine-Assisted English translation of Application No. KR20010103291, downloaded from google.com/patent on Oct. 19, 2018. 15 pages.

Partial computer-generated English language translation for FR1503956 A extracted from espacenet.com database on Nov. 19, 2020, 3 pages.

Yu et al., "Head-Neck Finite Element Model of the Crash Test Dummy THOR", International Journal of Crashworthiness, Woodhead Publishing, CA, vol. 9, No. 2, Mar. 1, 2004, pp. 175-186.

English language abstract for CN 202631257 U extracted from espacenet.com database on Sep. 21, 2023, 1 page.

English language abstract for CN 106482964 A extracted from espacenet.com database on Sep. 21, 2023, 1 page.

English language abstract for CN 107607327 A extracted from espacenet.com database on Sep. 21, 2023, 1 page.

Chinese Search Report for Application CN 2020105948701 dated Aug. 28, 2023, 3 pages.

\* cited by examiner

NECK ASSEMBLY FOR ANTHROPOMORPHIC TEST DEVICE

CROSS REFERENCE TO RELATED APPLICATION

The subject application claims priority to and all the benefits of U.S. Provisional Application Ser. No. 62/868,514 filed Jun. 28, 2019, the contents of which are incorporated herein by reference in their entirety.

BACKGROUND OF THE INVENTION

1. Field of the Invention

The present invention relates generally to an Anthropomorphic Test Device (ATD) and, more particularly, to a neck assembly for an ATD that can be used to assess and predict injuries under impact.

2. Description of the Related Art

Automotive, aviation, military, and other vehicle manufacturers conduct a wide variety of collision, ejection and under-body-blast (UBB) testing to measure the effects of an impact upon a vehicle and its occupants. Through the testing, a vehicle manufacturer gains valuable information that can be used to improve the impact worthiness of the vehicle.

Impact testing often involves the use of anthropomorphic test devices, better known as "crash test dummies." During the testing, an operator places a crash test dummy inside a vehicle, and the vehicle undergoes a simulated collision, UBB, or ejection. The testing exposes the crash test dummy to high inertial loading, and sensors inside the crash test dummy, such as load cells, displacement sensors, accelerometers, pressure gauges, angular rate sensors, and the like, generate electrical signals of data corresponding to the loading. Cables or wires transmit these electrical signals of data to a data acquisition system (DAS) for subsequent processing. This data reveals information about the effects of the impact on the crash test dummy and can be correlated to the effects a similar impact would have on a human occupant.

In order to obtain more accurate test data, test engineers attempt to maximize what is known as the "biofidelity" of the crash test dummy. Biofidelity is a measure of how well the crash test dummy reacts like a human being in a vehicle impact test environment. A crash test dummy reacting as an actual human during a collision is said to have a high biofidelity. Accordingly, a crash test dummy having a high biofidelity will provide more accurate information from a collision test relative to the effect of the collision on a human being. Thus, ATD engineers design crash test dummies with the proper anthropometry that reflects a total weight, center of gravity, mass moment of inertia and range of motion similar to that of a human body so as to increase the biofidelity of the crash test dummy.

It is known to provide a neck for a crash test dummy. In one crash test dummy, the neck has a cylindrical design with grooves around the neck. A groove depth and angle are used to control a performance of the neck. While this neck design provides good flexion and rear extension performance, it lacks the ability to adjust a lateral performance. In another crash test dummy, the neck has good lateral performance, but its flexion and extension performance were not good enough and could not be adjusted to meet the requirements for different loading directions with one design due to its axial symmetrical mechanical design.

Current neck designs also do not generally represent the torsion response of a human. The human head can rotate approximate 45 degrees laterally (turned position) at low resistance from the neck, while no existing crash test dummy neck design is believed to be able to simulate this response.

From a biomechanics research study, a human neck has different performance in forward flexion and lateral bending. The bending stiffness are similar between the two directions up to a certain angles, where the frontal and lateral bending start to differentiate each other. However, when forward flexion reaches eighty degrees (80°) bending, the neck bottoms out and the stiffness increases quickly. For lateral bending, the neck bottoms out near forty-five degrees (45°).

It has been difficult to replicate a human neck for an ATD. In particular, a neck was needed to be developed to be unique for ATD's due to different responses in each direction. As a result, it is desirable to develop a neck for an ATD that can perform like a human neck for flexion, extension, lateral bending, and torsion. Therefore, there is a need in the art to provide a neck assembly for use in an ATD so that biofidelity of the ATD is improved.

SUMMARY OF THE INVENTION

Accordingly, the present invention provides a neck assembly for an anthropomorphic test device (ATD). The neck assembly includes a plurality of vertebra discs having an uppermost disc and a joint element disposed between each respective pair of said vertebra discs.

The neck assembly also includes a torsion assembly including a neck interface plate mounted to an uppermost disc of the plurality of vertebra discs with the neck interface plate having a plurality of spaced torsion stops. The torsion assembly also includes an upper member coupled to the neck interface plate that is configured for supporting a head assembly of the ATD with the upper member rotatable from a neutral position to a turned position relative to the neck interface plate about an axis A extending through the upper member and the neck interface plate. The upper member has a stop portion for selectively engaging one of the torsion stops during an impact condition to prevent further rotation in a turned position. The torsion assembly also includes a resilient member having a plurality of projections positioned between the upper member and the neck interface plate with the resilient member engaging the upper member for at least partial concurrent movement during the rotation of the upper member relative to the neck interface plate wherein the plurality of projections bend in a direction responsive to a direction of rotation of the upper member relative to the neck interface plate about its longitudinal axis A during the impact condition.

In addition, the present invention provides an ATD including a body, a head assembly and a neck assembly as described above connected to the body and to the head assembly.

One advantage of the present invention is that a new neck assembly is provided for an ATD. Another advantage of the present invention is that the neck assembly for an ATD can simulate a human neck's biomechanical performance. Yet another advantage of the present invention is that the neck assembly for an ATD simulates a human neck in all directions. Still another advantage of the present invention is that the neck assembly for an ATD can meet biomechanical response requirements in flexion, extension, lateral bending, and torsion. A further advantage of the present invention is that that the neck assembly for an ATD follows a human neck vertebra curvature posture. Yet a further advantage of the present invention is that the neck assembly for an ATD includes inserts having a profile that reduces the amount of neck lateral rotation for early bottoming out. Another advantage of the present invention is that the neck assembly has an upper element that allows the head to rotate along its vertical axis up to approximate 45 degrees at low resistance. A still further advantage of the present invention is that the neck assembly for an ATD includes inserts having a tunable profile that allows the neck to perform differently in flexion and lateral bending. Another advantage of the present invention is that the ligament joints have a cone-shaped cross-section to evenly distribute the deformation like a human neck. Yet another advantage of the present invention is that the neck assembly has superior biofidelity response and reduced complexity to make it user friendly.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
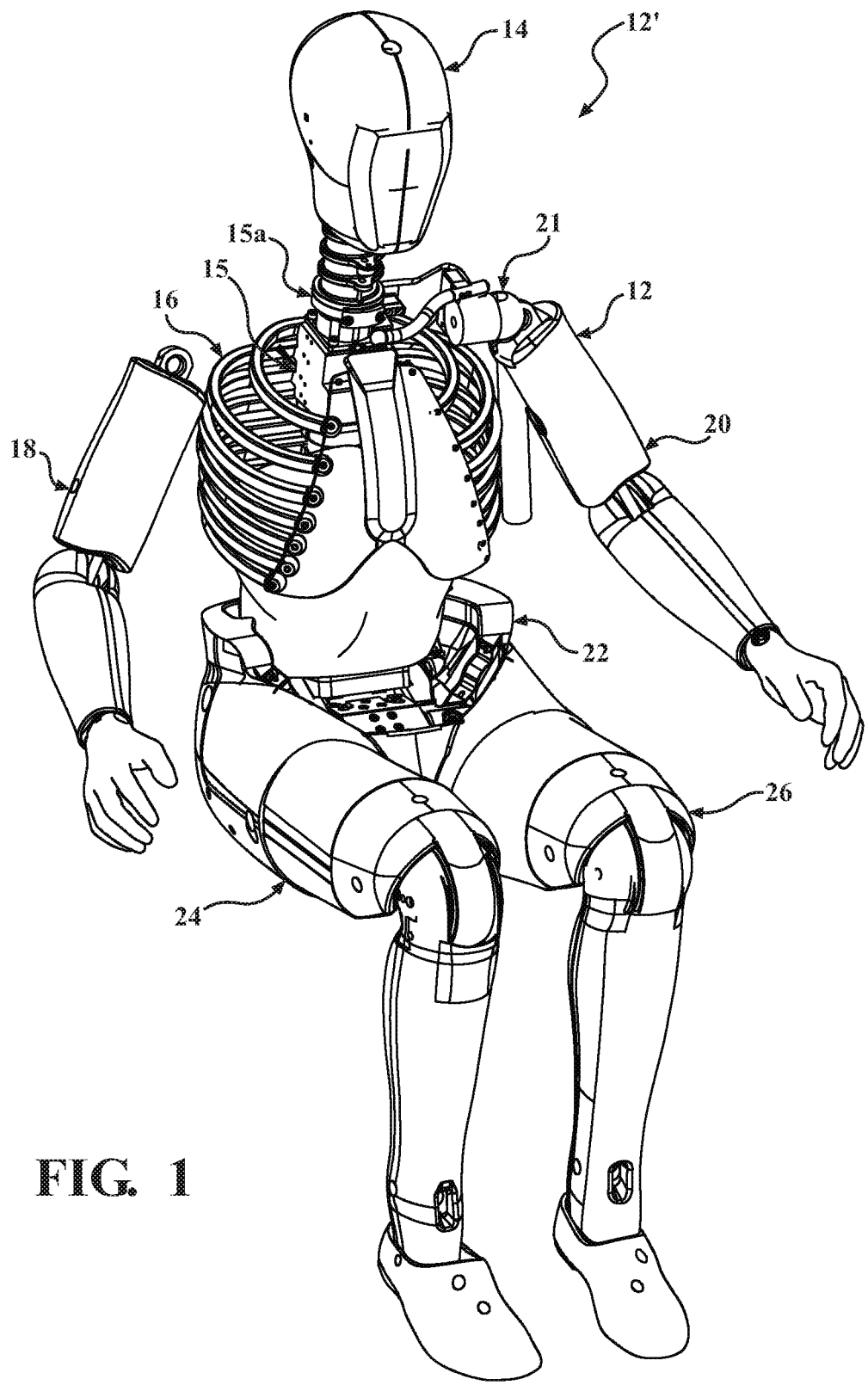
FIG. 1 is a perspective view of an ATD.
Figure 2:
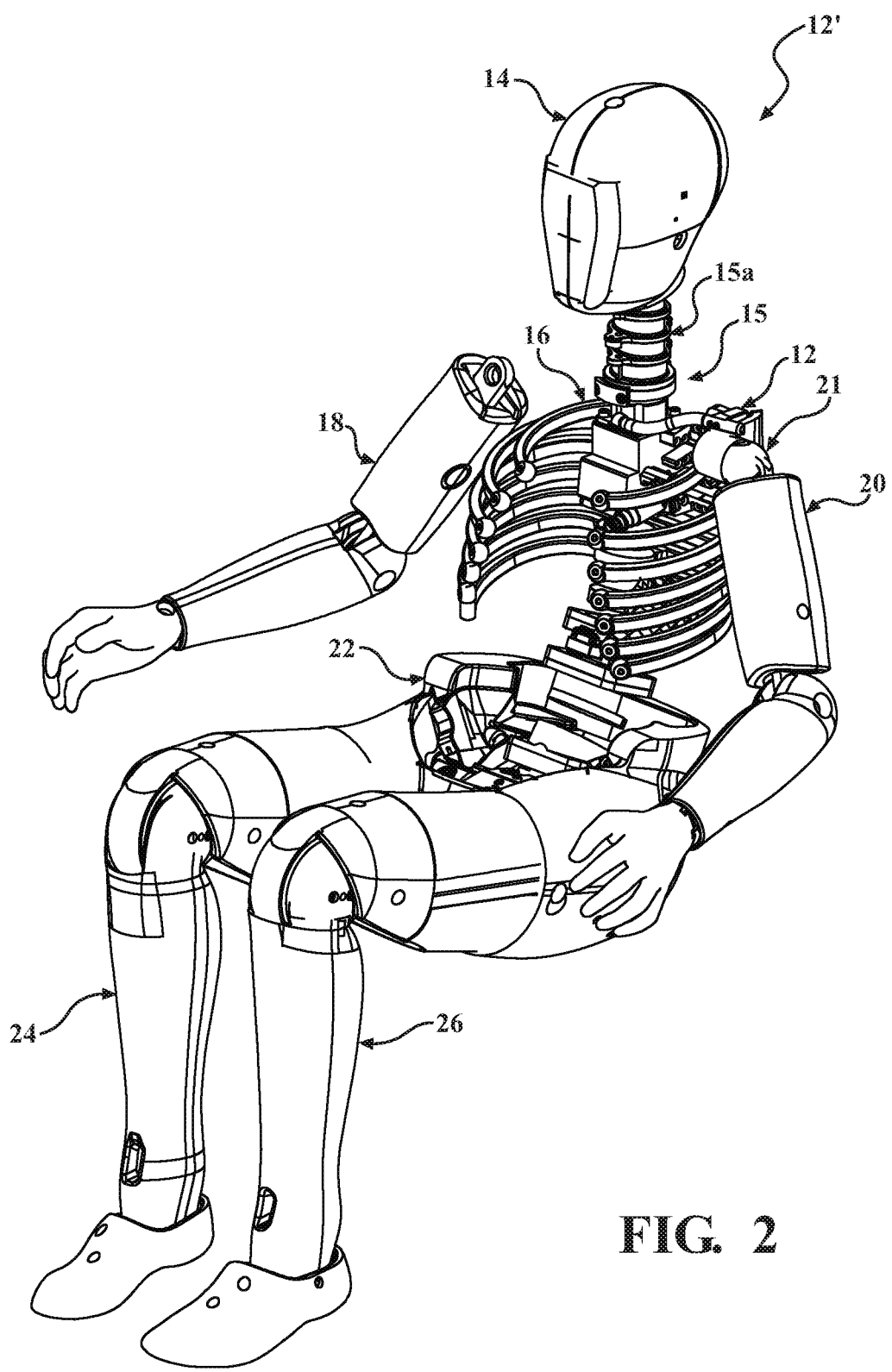
FIG. 2 is another perspective view of the ATD of FIG. 1.

Referring to the drawings and in particular FIGS. 1 and 2, one embodiment of an ATD, for example a crash test dummy, according to the present invention, is generally indicated at 12. In one embodiment, the crash test dummy 12 is of a fiftieth percentile (50%) male type and is illustrated in a sitting posture. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. It should also be appreciated that the crash test dummy 12 may be of any suitable size.

As illustrated in FIG. 1, the crash test dummy 12 includes a head assembly, generally indicated at 14. The head assembly 14 includes a one-piece plastic or metal skull, an instrumentation core, and a polymeric skin, such as a vinyl skin. The instrumentation core is removable for access to head instrumentation contained inside the head assembly 14. The crash test dummy 12 also includes a spine assembly 15, here a thoracic spine assembly 15, with a neck assembly 15a with an upper end mounted to the head assembly 14 by a nodding block (not shown) and a nodding joint (not shown) of the spine assembly 15. The neck assembly 15a has a lower end extending into a torso area of the crash test dummy 12 and is connected to a spine mounting weldment (not shown) by an adapter assembly (not shown). The spine assembly 15 extends downwardly to a pelvis assembly 22. An example of a neck assembly is disclosed in U.S. patent application Ser. No. 14/981,034, filed Dec. 28, 2015, the entire disclosure of which is expressly incorporated herein by reference.

The torso area of the crash test dummy 12 includes a rib cage assembly, generally indicated at 16, connected to the spine assembly 15. The crash test dummy 12 also has a pair of arm assemblies including a right arm assembly, generally indicated at 18, and a left arm assembly, generally indicated at 20, which are attached to the crash test dummy 12 via a shoulder assembly, generally indicated at 21. The left arm assembly 20 includes a clavicle link (not shown), which connects a clavicle (not shown) to the top of the spine assembly 15. It should be appreciated that the right arm assembly 18 is constructed in a similar manner.

The crash test dummy 12 also includes a pelvis assembly 22 connected to the pelvic adapter. The crash test dummy 12 includes a right leg assembly 24 and a left leg assembly 26, which are attached to the pelvis assembly 22. It should be appreciated that various components of the crash test dummy 12 may be covered in a polyvinyl skin such as a flesh and skin assembly to achieve a good biofidelity of the crash test dummy 12.

Figure 3A:
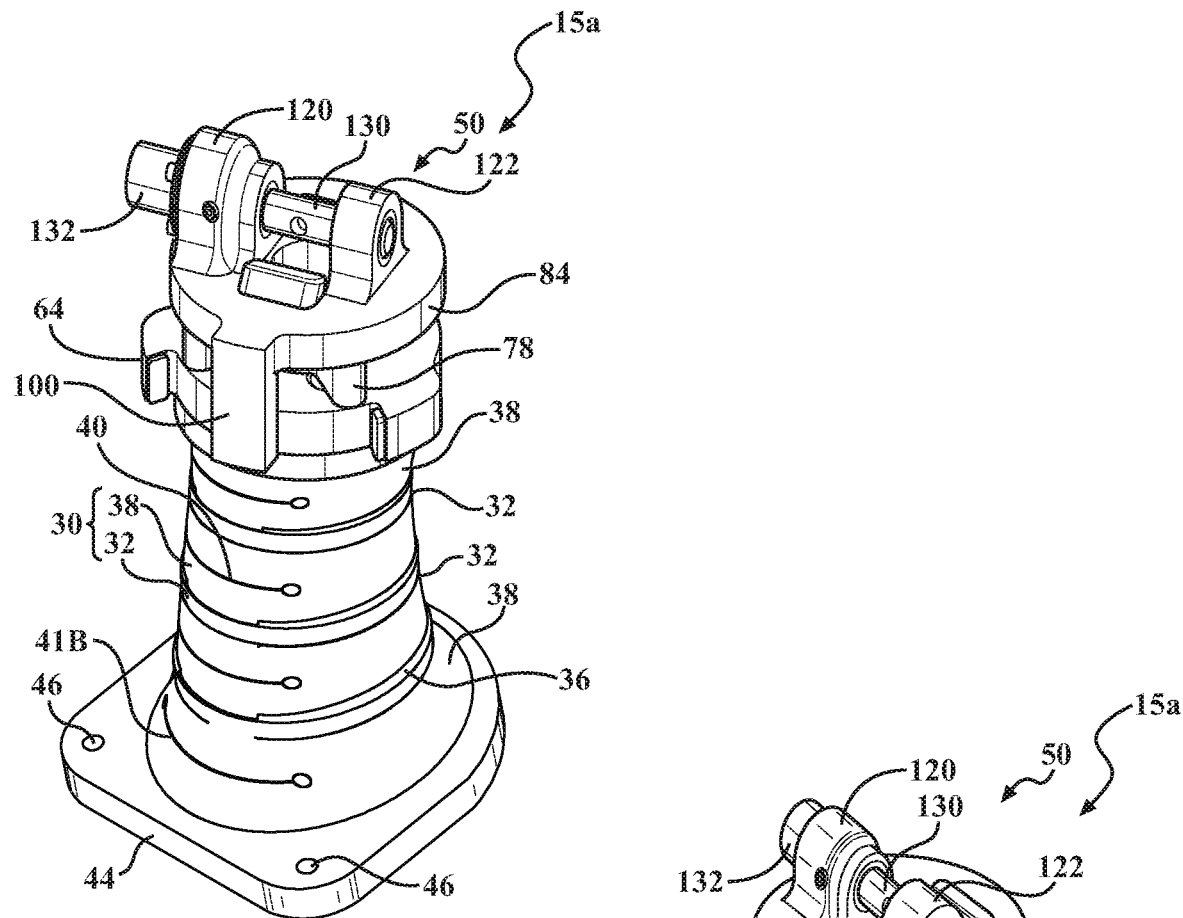
FIG. 3A is a perspective view of a neck assembly, according to one embodiment of the present invention, for the ATD of FIGS. 1 and 2 in the rest, or neutral, position.
Figure 3B:
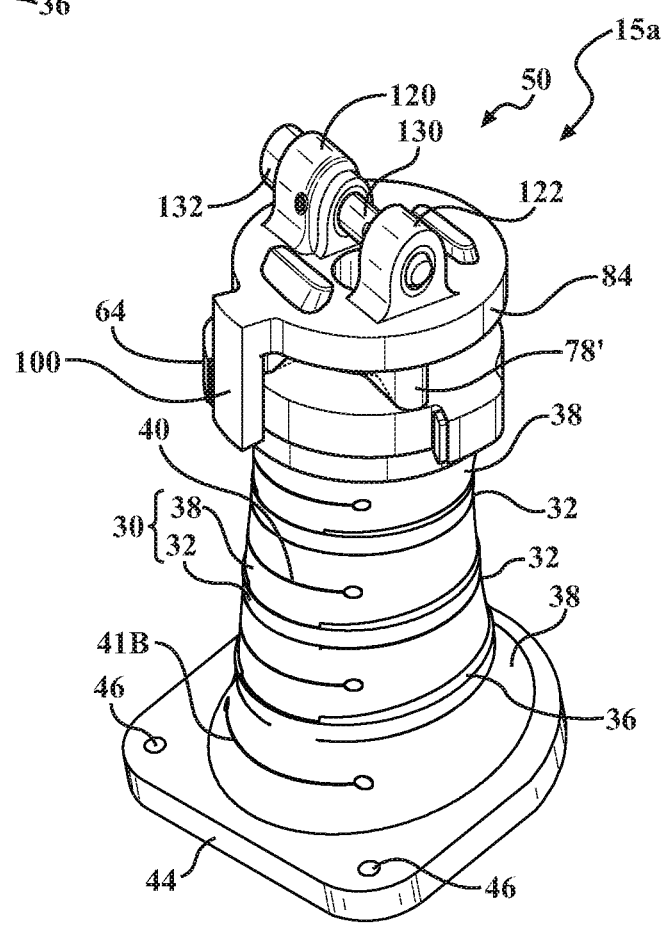
FIG. 3B is a perspective view of a neck assembly, according to one embodiment of the present invention, for the ATD of FIGS. 1 and 2 in the turned position, corresponding to an impact condition of the ATD.
Figure 4:
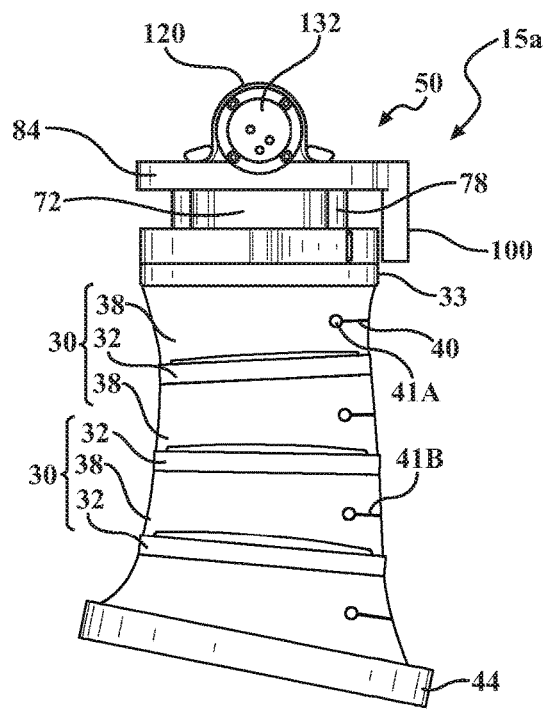
FIG. 4 is a side elevational view of the neck assembly of FIG. 3.
Figure 5:
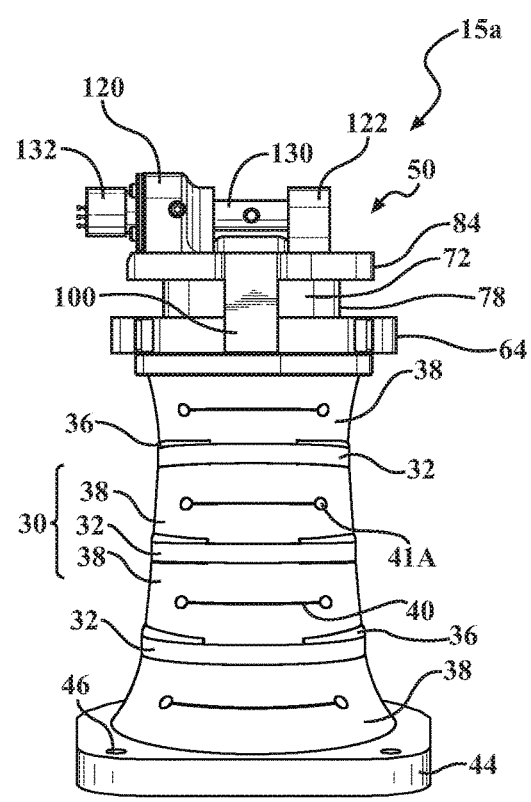
FIG. 5 is a front elevational view of the neck assembly of FIG. 3.
Figure 6:
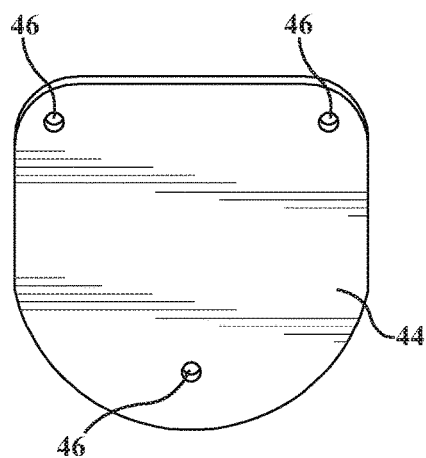
FIG. 6 is a bottom view of the neck assembly of FIG. 3.
Figure 7:
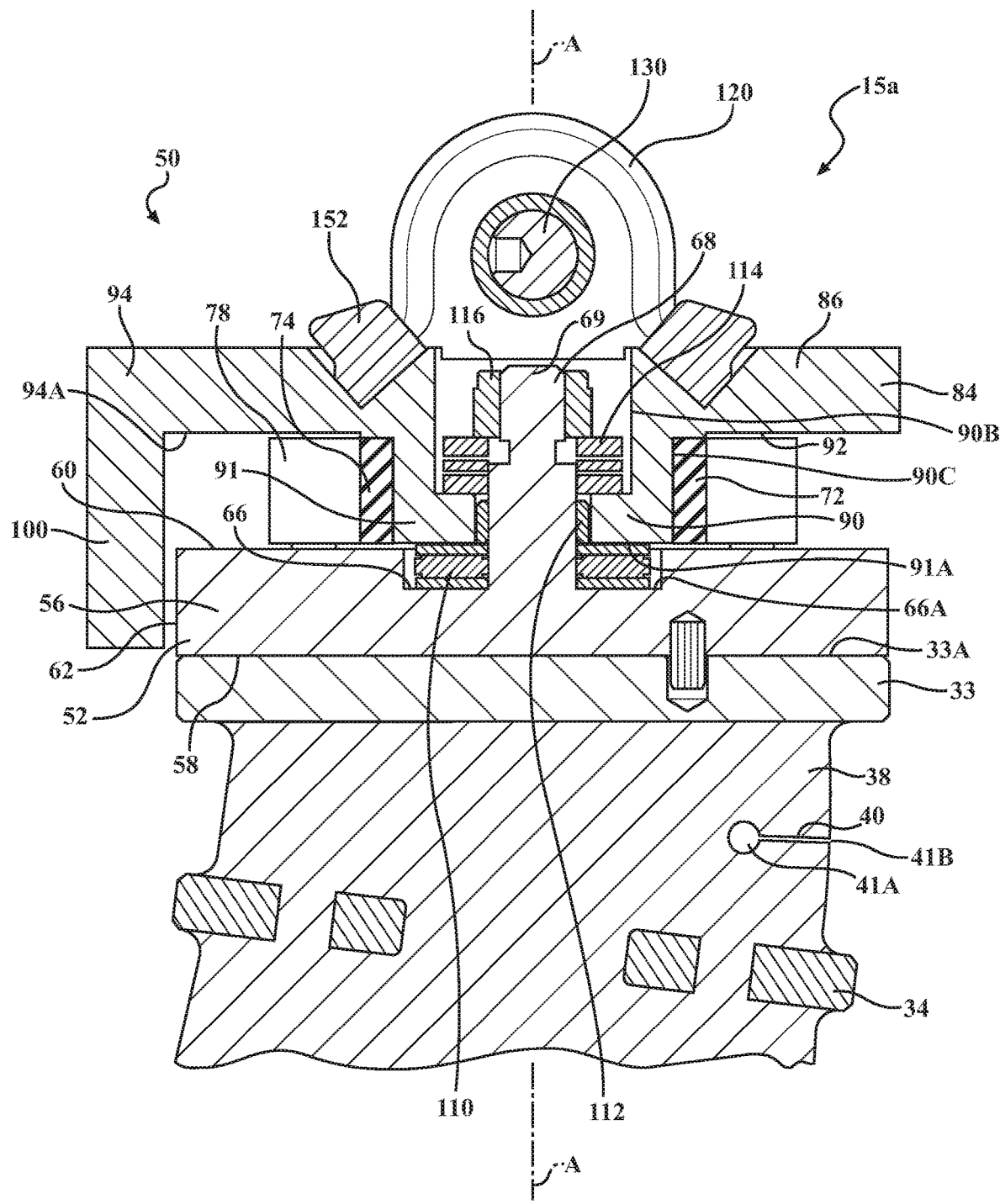
FIG. 7 is a partial sectional view of a portion of the neck assembly of FIG. 4.
Figure 8:
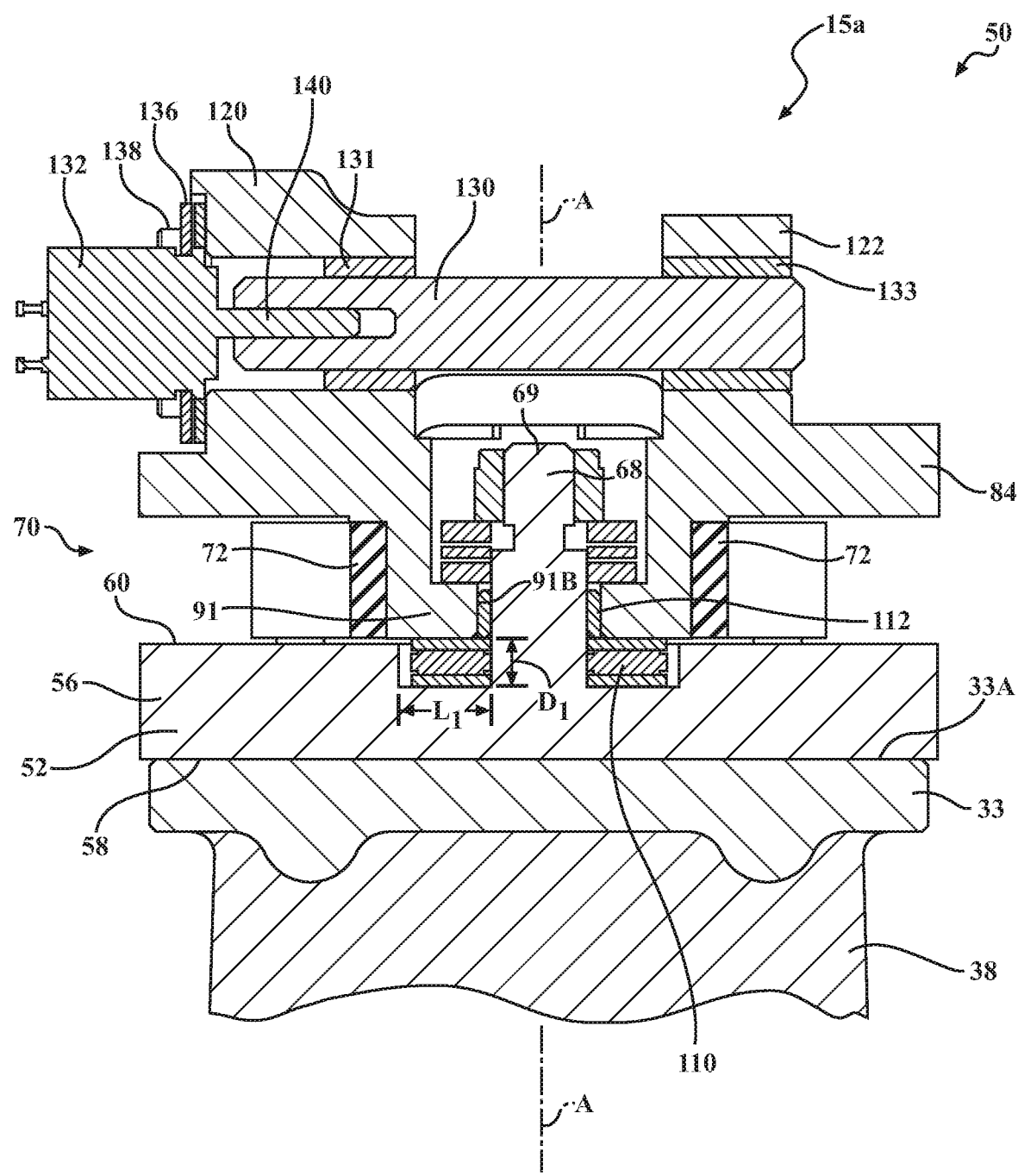
FIG. 8 is a partial sectional view of a portion of the neck assembly of FIG. 5.
Figure 9:
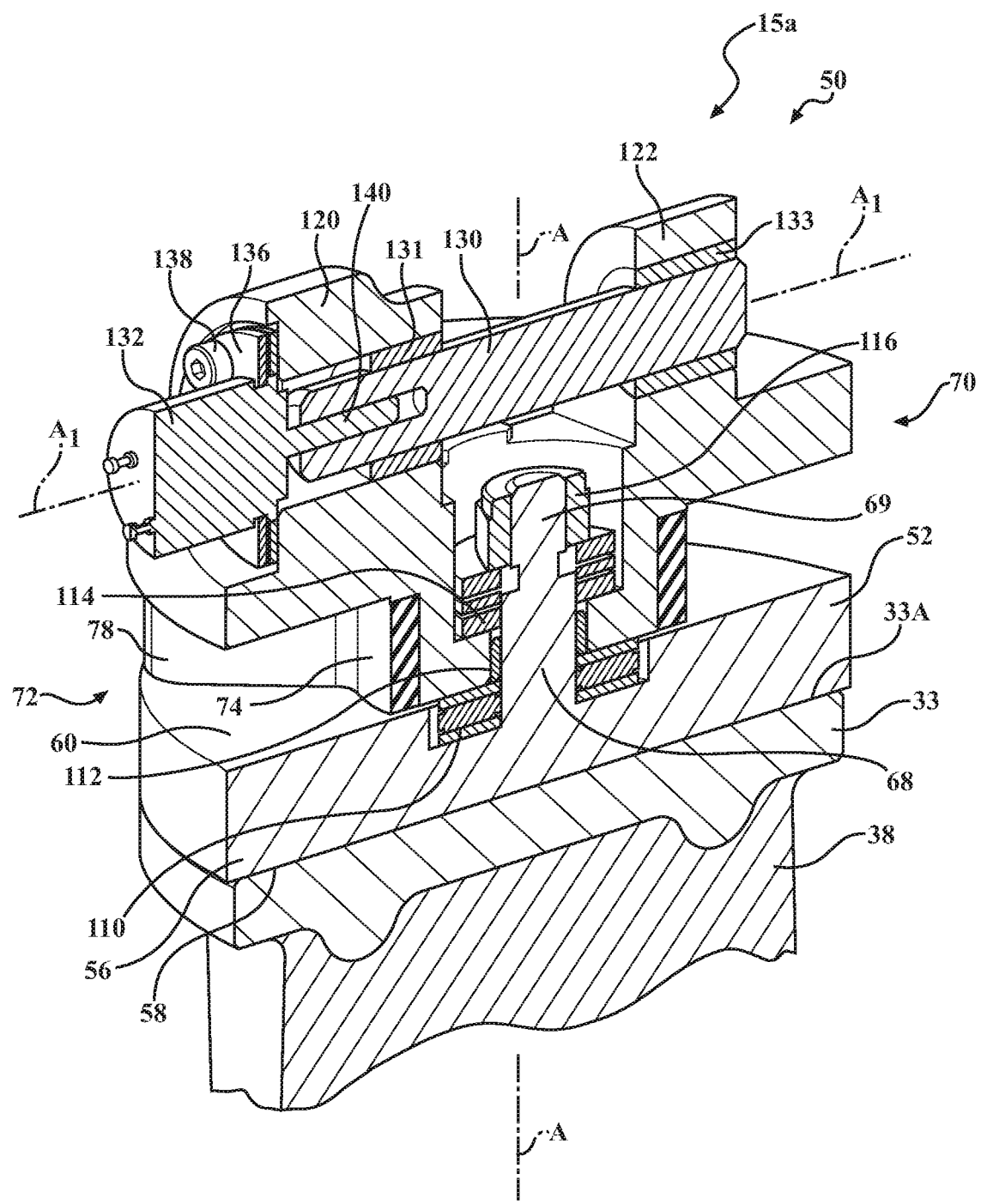
FIG. 9 is a sectional view and partial perspective view of a portion of the neck assembly of FIGS. 3-5.
Figure 10:
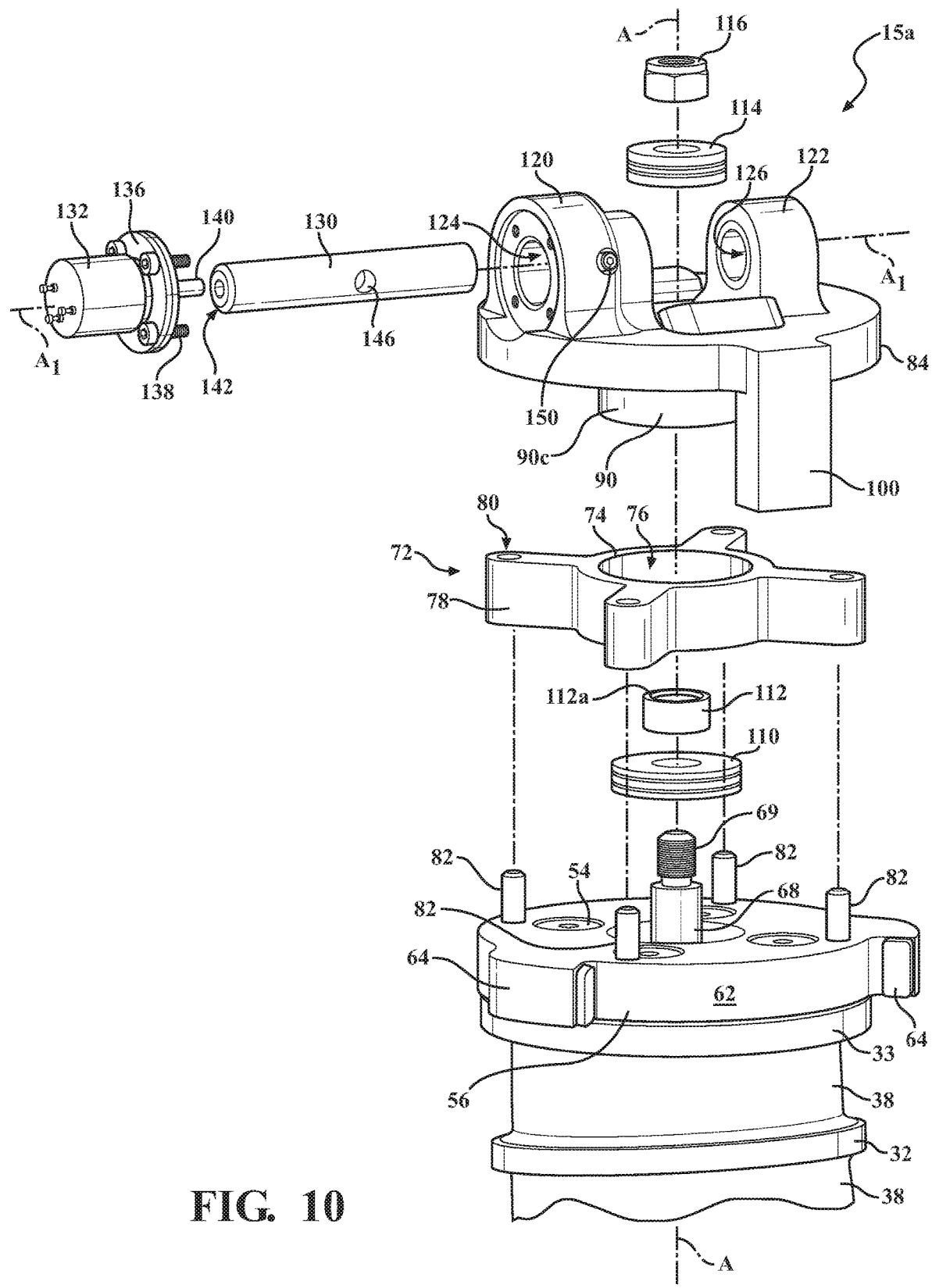
FIGS. 10-14 are various partial exploded views of a portion of the neck assembly of FIGS. 3-5.
Figure 11:
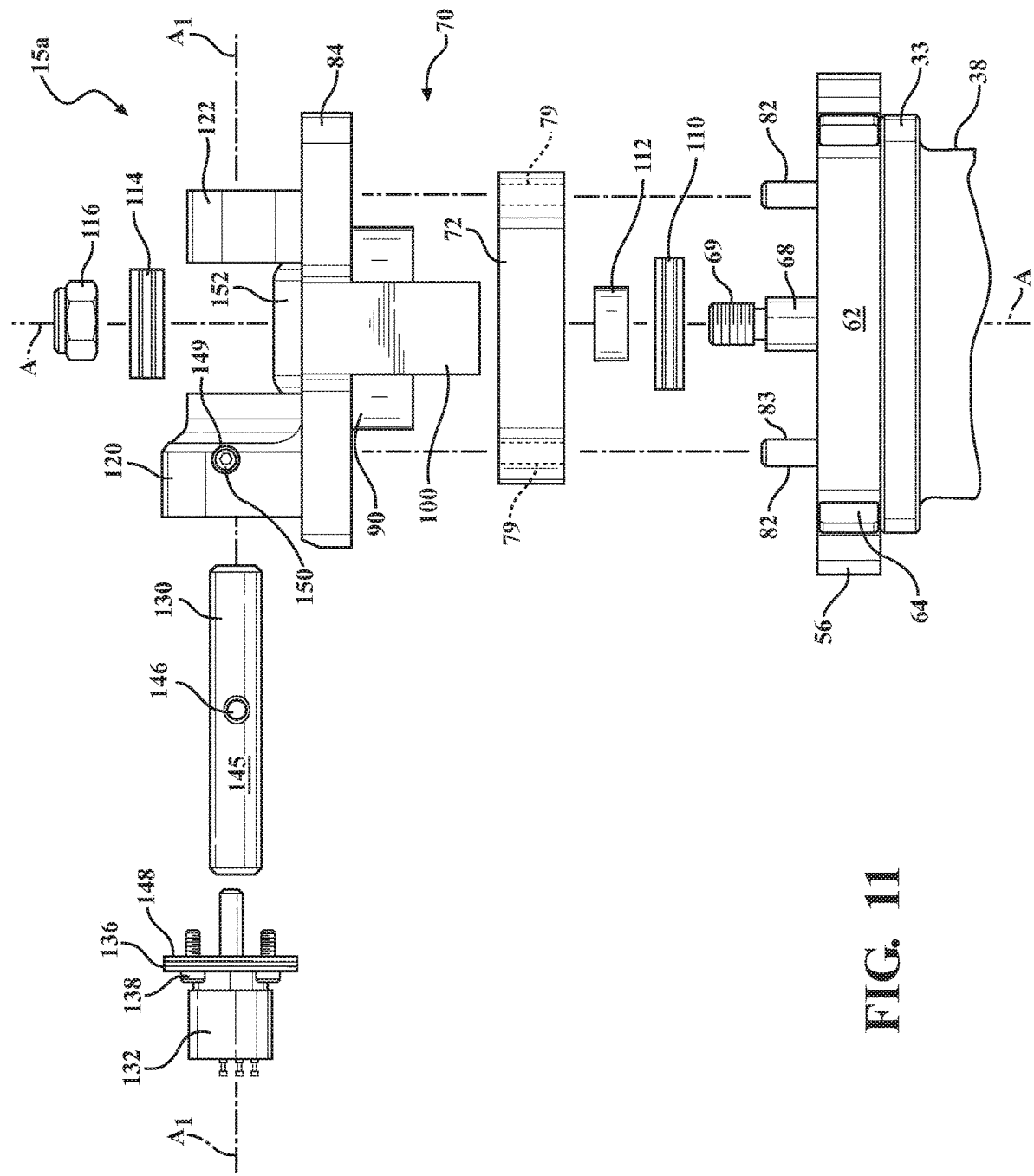
Figure 12:
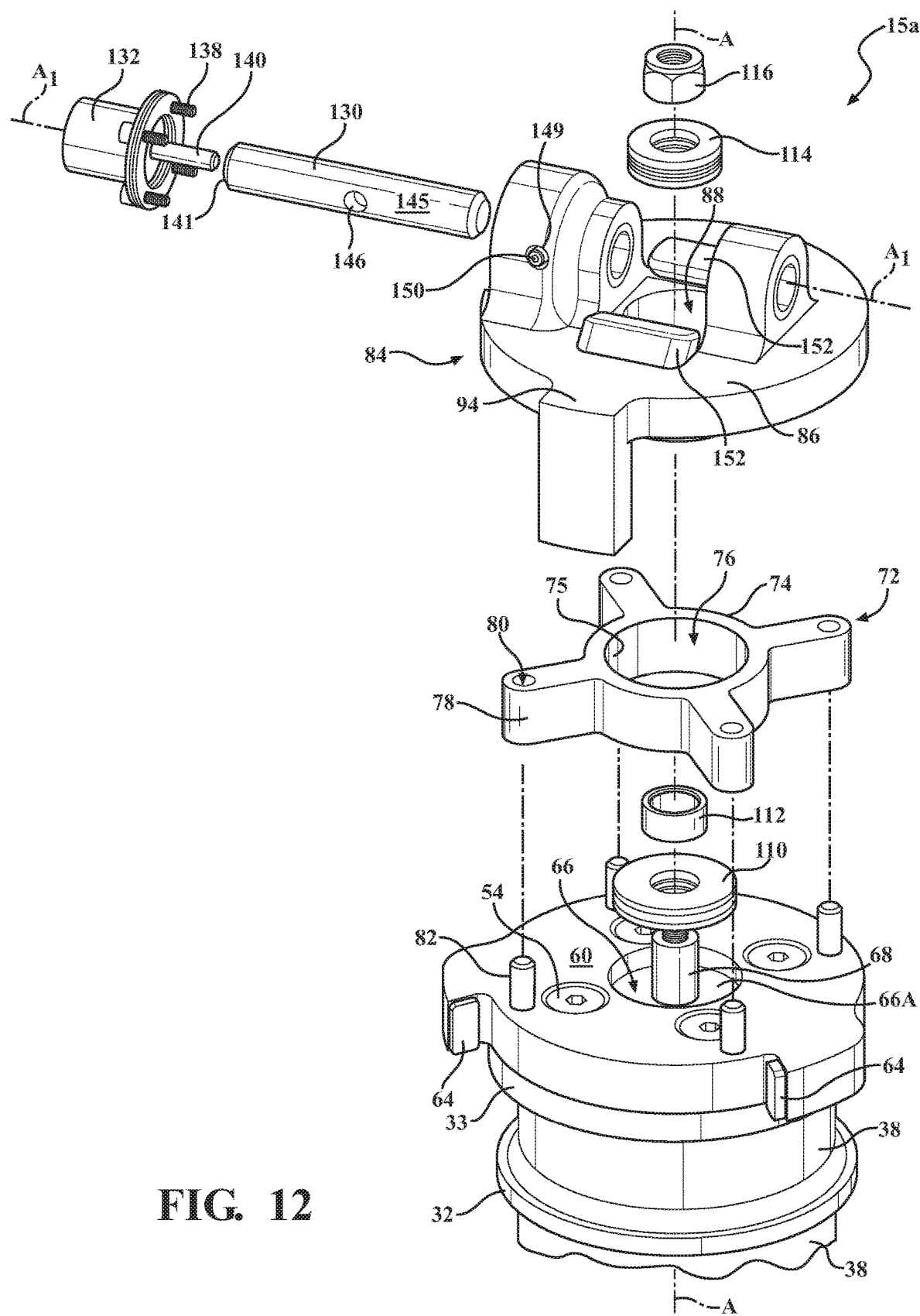
Figure 13:
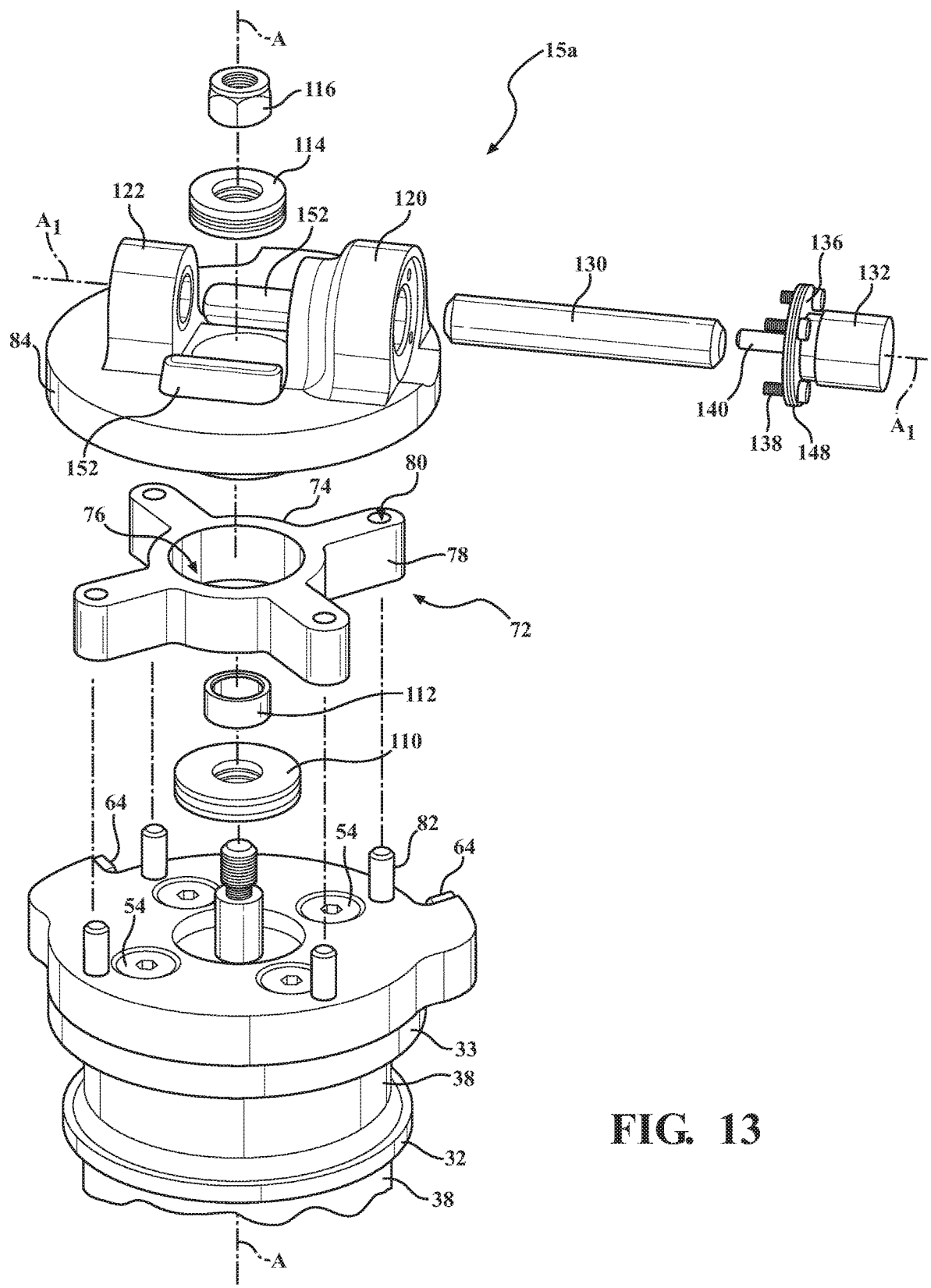
Figure 14:
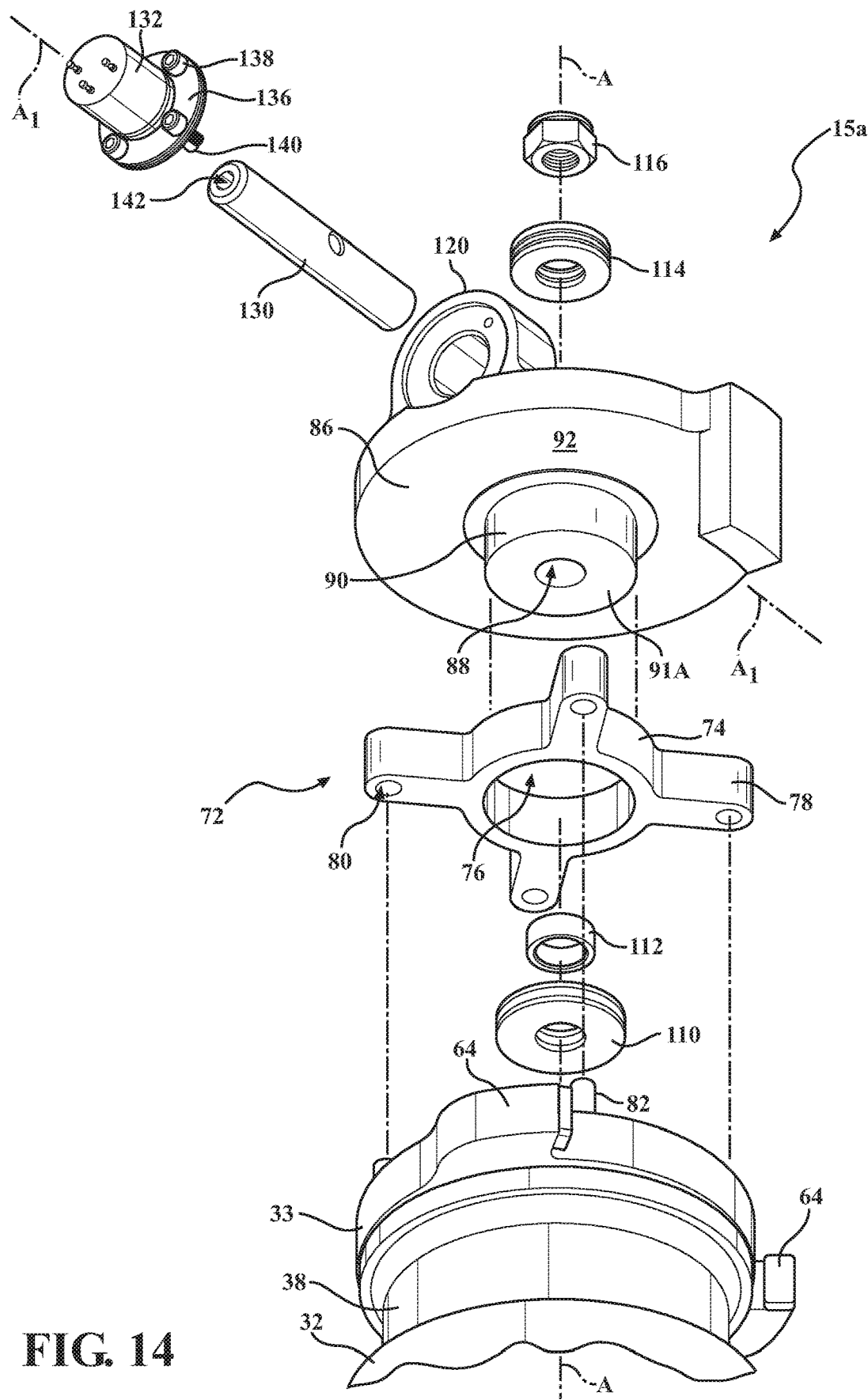

Referring to FIGS. 3-14, one embodiment of a neck assembly 15a, according to the present invention, is shown to replace the neck assembly 15a. The neck assembly 15a represents a human neck. The neck assembly 15a includes a plurality of modular vertebra segments, generally indicated at 30. In the embodiment illustrated, the neck assembly 15a has a plurality of cervical spine vertebra segments 30 (shown in the FIGS. as four (4) cervical spine vertebra segments 30). As best illustrated in FIGS. 3-5, each vertebra segment 30 includes a vertebra disc 32 having a height or thickness corresponding to its location in the cervical of the neck assembly 15a. In one embodiment, the vertebra disc 32 is made of a relatively rigid material such as metal or hard plastic. The vertebra disc 32 includes at least one aperture 34 (see FIG. 7) extending axially therethrough and centrally located within the vertebra disc 32. The vertebra disc 32 is generally circular in shape but may be any suitable shape to simulate a human neck. The vertebra disc 32 has one or more raised portions 36 on at least one side thereof. In the embodiment illustrated, the vertebra disc 32 has a pair of opposed raised portions 36 on both sides thereof. The raised portions 36 are generally arcuate in shape. The raised portions 36 have a varying height with a greatest height in a middle thereof and reducing in height to the ends thereof. It should be appreciated that the raised portions 36 of the vertebra disc 32 will be located on the sides of the neck assembly 15a. It should also be appreciated that it is intended to limit the lateral range of motion since a human neck lateral bending angle is less than that of its flexion.

Referring to FIGS. 3-5 each vertebra segment 30 includes a joint element 38 disposed between each respective pair (i.e., adjacent) vertebra discs 32. The joint element 38 is made of a flexible material such as an elastomeric material, for example, rubber. In one embodiment, the joint element 38 has a frusto-conical shape. The joint element 38 is connected to an upper vertebra disc 32 and a lower vertebra disc 32 via a suitable mechanism such as bonding during a molding process. It should be appreciated that each joint element 38 is integral and one-piece.

The joint element 38 may include a cutout 40 on a front side to soften the neck assembly 15a to meet the extension performance for different spine curvature. The stiffness of the human neck rearward extensions is typically softer than that of its forward flexion. The cutouts 40 are located on a front side of the neck assembly 15a in the joint element 38 between the vertebra discs 32. In the embodiment illustrated, the cutouts 40 are formed by forming a hole 41A, such as through drilling a hole 41A, through the joint element 38 and used a shape blade to cut a slit 41B extending between the holes 41A to a desired depth within the joint element 38. This process is to facilitate rubber manufacturing and also improve the durability of the neck assembly 15a. It should be appreciated that the hole 41A at either end of the slit 41B will prevent rubber tearing during testing. It should also be appreciated that, with this feature, the forward neck flexion performance would remain the same due to the compression on the front side of the neck assembly 15a. It should further be appreciated that, for extension, the side with stiffness reduction will be in tension, the cutouts 40 will open up and therefore reduce the amount of materials engaged in bending. It should still further be appreciated that the stiffness is reduced accordingly by the inclusion of the cutouts 40.

The neck assembly 15a includes a lower mounting plate 44 connected to the thoracic spine assembly 15 by a suitable mechanism such as fasteners (not shown), which may alternatively be referred to as the lowermost one 44 of the vertebra discs 32. In one embodiment, the lower mounting plate 44 has a plurality of apertures 46 extending therethrough to receive the fasteners. The neck assembly 15a includes an uppermost one 33 of the upper vertebra discs 32 (i.e., the uppermost one vertebra disc 33) at an upper end of one of the joint elements 38. In this embodiment, the uppermost one vertebra disc 33 has a planar upper surface 33A (see FIGS. 7-9). It should be appreciated that the neck assembly 15a has a cross-section that is increased gradually from the top to the bottom so that the load to the neck can be distributed like in a human when the head is impacted in a crash.

The neck assembly 15a also includes a torsion assembly, generally indicated at 50, to simulate neck torsion response.

As best shown in the section and exploded views of FIGS. 7-14, the torsion assembly 50 includes a neck interface plate 52, which is seated onto, or otherwise mounted to, the planer upper surface 33A of the uppermost one vertebra disc 33 and secured to the uppermost vertebra disc 33 using one or more fasteners 54, shown as flat headed screws 54. The neck interface plate 52 includes a base region 56 having a lower surface 58 coupled adjacent to the planar upper surface 33A and an opposing upper surface 60 and an edge surface 62 connecting the lower surface 58 to the upper surface 60. The base region 56 is generally circular in shape and includes a plurality of torsion stops 64 spaced circumferentially about the base region 56 extending from an outer edge surface 62. The upper surface 60, and in particular a central region of the upper surface 62, includes an annular recessed region 66 having a depth D1 and a length L1 and a neck interface plate projection portion 68 extending from a center of the annular recessed region 66 in a direction normal to and away from the both the upper surface 66A of the annular recessed region 66 and the planer upper surface 33A of the uppermost vertebra disc 33 (shown as upwardly away from both the upper surface 60 of the annular recessed region 66 and the planar upper surface 33A in FIGS. 7-14).

The torsion assembly 50 also includes a torsion element 70 cooperating with and rotatable relative to the neck interface plate 52 about an axis A.

As best shown in FIGS. 10-14, the torsion element 70 includes a bottom resilient member 72. The bottom resilient member 72 includes a hub portion 74 having a central opening 76 through which the projection portion 68 extends. The resilient bottom member 72 also includes a series, or plurality, of finger-like projection portions 78 extending radially outwardly from the hub portion 74 relative to the central opening 76 that are seated onto the upper surface 60 of the of the neck interface plate 52 outwardly from the annular recessed region 66. Each of the plurality of finger like projection portions 78 includes an opening 80 for receipt of a respective pin 82 extending upwardly from the upper surface 60 of the base region 56 of the neck interface plate 52 that is used to secure a portion of the resilient bottom member 72 to the neck interface plate 52. In the normal orthogonal position, or rest or neutral position, of the neck assembly 15a (as shown in the FIGS. 1-2, 3A, and 4-14, see in particular FIG. 3A), corresponding to when there is no impact condition (and hence no applied external load) as will be described further below, the pin 82 is generally centered within the respective opening 80 such that outer surface 83 along the length of the pin 82 is generally parallel with the corresponding length of an inner surface 79 of the finger-like projection 78 defining the respective opening 80. Conversely, in the non-orthogonal position, or turned position, of the neck assembly 15a (see FIG. 3B), corresponding to when there is an impact condition (and hence there is an applied external load) as will be described further below, the outer surface 83 is generally brought into contact with the inner surface 79 of the finger-like projection 78 defining the respective opening 80 in the direction opposite the bending or stretching of the finger-like projection, as will also be described further below.

The torsion element 70 also includes an upper member 84 coupled to the bottom resilient member 72. The upper member 84 includes a central hub region 86 defining a central opening 88 through which the terminal end 69 of the projection portion 68 extends. A flange member 90 extends from the central hub region 86 and is located between the bottom resilient member 72 and the central projection 68 and further defines the central opening 88. Accordingly, as the upper member 84 rotates about axis A in the impact condition from the rest or neutral position to the turned position, the resilient member 72 correspondingly rotates in conjunction therewith with the flange member 90 is engaging with the inner surface 75 of the bottom resilient member 72 defining the central opening 76. The flange member 90 also further defines the central opening 88. The terminal end 91 of the flange member 90 extends further inwardly towards the projection portion 68, with the lower surface 91A of the terminal end 91 extending parallel and spaced from the upper surface 66A of the annular recessed region 66.

A bottom surface 92 of the central hub region 86 is positioned adjacent to an upper surface of the central hub 74 of the bottom resilient member 72. An adhesive (not shown) is used to affix the inner surface 75 defining the opening 76 of the hub portion 74 to the outer surface 90C of the flange member 90.

The upper member 84 further includes a radially extending region 94 that extends outwardly from the central hub region 86, with its bottom surface 94A being generally parallel with, and spaced from, the upper surface 60 of the neck interface plate 52 outward of the annular recessed region 66. A stop portion 100 extends normal to the radially extending region 94 towards the vertebra segments 30 and adjacent to and outwardly from the outer edge surface 62 of the neck interface plate 52 between one respective pair of the plurality of torsion stops 64.

The torsion assembly 70 also includes a first thrust bearing 110 that is disposed between lower terminal surface 91A of the flange member 90, the upper surface 66A of the annular recessed region 66, and the projection portion 68. In addition, the torsion assembly 70 includes a sleeve bearing 112 disposed between an inward surface 91B of the terminal end 91 of the flange member 90 and the projection portion 68. Still further, a second thrust bearing 114 is disposed adjacent to an upper surface 90B of the flange member 90 and adjacent to an upper surface 112A of the sleeve bearing 112 and outwardly from the projection portion 68. A locking nut 116 is threadingly engaged to the terminal end 69 of the projection portion 68 and holds the second thrust bearing 114 and sleeve bearing 112 in place between the first thrust bearing 110 and the locking nut 116 in the assembled state.

In further embodiments, the radially extending region 94 of the upper member 84 of the neck assembly 15a also includes a pair of spaced apart head interface plates 120, 122. Each of the head interface plates 120, 122 includes an opening 124, 126, typically a central opening 124, 126, respectively aligned along an axis A1.

An occipital condyle pin 130 is inserted within the axially aligned openings 124, 126. The occipital condyle pin 130 as illustrated is rotationally supported within the respective openings 124, 126 with bushings 131, 133 about axis A1. In addition, an outer surface 145 of the occipital condyle pin 130 includes a central opening 146 for receipt of a bolt (not shown) to connect the occipital condyle pin 130 to the head assembly 14.

The occipital condyle pin 130 is configured to rotate about axis A1 in a frontward rotational direction for moving the head assembly 14 in a forward direction relative to the neck assembly 15a, and rotate in a rearward rotational direction opposite the frontward rotational direction for moving the head assembly 14 in a rearward direction, with the rotational movement being relative to the bushings 131 and 133 and head interface plates 120, 122, of the neck assembly 15a respectively, during a front or rear impact (i.e., the bushings 131 and 133, and head interface plates 120, 122, of the neck assembly 15a do not rotate about axis A1 in conjunction with the occipital condyle pin 130).

In still further embodiments, the upper member 84 also includes a pair of upper neck stops 152 extending between the head interface plates 120, 122. The upper neck stops 152 functions to limit movement of the head assembly 14 forward or rearward during a front or rear impact resulting in the rotation of the upper condyle pin about axis A1 as described above.

The neck assembly 15a also includes a potentiometer 132 that is fixedly coupled to one of the head interface plates 120, 122 (shown in the representative Figures fixedly coupled to the head interface plate 120) using a clamp 136 and one or more fasteners (shown as a plurality of socket head clamp screws 138) and includes a shaft 140 inserted within a slot opening 142 in the distal end 141 of the occipital condyle pin 130. A set screw 150 is inserted within a through hole 149 in the first head interface plate 120 and within a threaded hole (not shown) in the occipital condyle pin 130 to secure shaft 140 within the distal end 141 of the occipital condyle pin 130. A washer 148 is inserted between the clamp 136 and the head interface plate 120 to space the clamp 136 from the head interface plate 120.

The potentiometer 132 is of conventional design, and includes a resistive element, a sliding contact, or wiper, that moves along the element and makes electrical contact with the resistive element, electrical terminals at each end of the resistive element, a mechanism that moves the wiper from one end to the other, and a housing containing the resistive element and wiper. The potentiometer 132 is configured to sense the rotational movement of the occipital condyle pin 130 about the axis A1 during a front or rear impact, as described above, when the head assembly 14 moves forward or rearward relative to the neck assembly 15a and spine assembly in certain impact situation, by sensing and interpreting a change of position of the wiper relative to the resistive element during the impact situation. In conjunction with the potentiometer 132, the crash test dummy 12 may also include one or more load cells (not shown) that are coupled to various parts of the head assembly 12, neck assembly 15a or thoracic spine assembly 15 that measure force changes during an impact condition. These load cell output are electrically synchronized with the potentiometer 132 by the data acquisition system and thus provides information that can be combined with the readings from the potentiometer 132 to indicate the additional forces on the crash test dummy not associated with the rotational movement of the torsion member 70 during certain impact situations.

The crash test dummy 12, as described herein, is designed to closely resemble a human-like response during a crash situation (i.e., a crash test simulation), and in particular a human-like response of the neck area of a human during such crash test simulations.

During crash test simulations, the torsion member 70 of the neck assembly 15a may rotate about the axis A relative to the neck interface plate 50 in response to an impact condition (i.e., an external load being applied on the crash test dummy 12, see FIG. 3B) so as to simulate a proper human like neck torsion response similar to the equivalent real world crash situations.

In particular, the impact condition (i.e., the crash simulation, shown in FIG. 3B) in the form of an external load applied to the crash test dummy 12 causes the rotation of the upper member 84 about the axis A which, in turn, causes the rotation of the hub portion 74 of the bottom resilient member 72 about the axis A in response. However, because the finger-like projection portions 78 are not affixed to the upper plate 84, and because pins 82 extending from the upper surface 60 of the neck interface plate 52 are inserted within openings 80 in the finger-like projection portions 78, and because the finger-like projection portions 78 are formed from a resilient material, the finger-like projections 78 bend or otherwise stretch in the direction of the rotation of the hub portion 74 (shown as 78' in FIG. 3B), with a portion of the inner surface 79 of each respective finger-like projection 78 being brought into contact with the outer surface 83 of the respective pin 82 but are configured wherein the pins 82 remain within the respective openings 80 (and hence the outer surface 83 of one or more of the pins 82 are no longer parallel to the respective inner surface 82 of the respective finger-like projection 78). This is also referred to as the non-orthogonal position or bent position (see the bent finger-like projection 78 in FIG. 3B).

The range of rotation of the torsion member 70 relative to the neck interface plate 52 is limited to a predetermined maximum range of rotation about the axis A in a first rotational direction, or a second rotational direction opposite the first rotational direction, wherein the stop portion 100 is brought into contact with one of the torsion stops 64 (also shown in FIG. 3B). In certain embodiments, the torsion stops 64 limit the range of rotation of the torsion member 70 up to approximately 45 degrees in a first rotational direction relative to a midpoint between the pair of torsion stops 64, or up to approximately 45 degrees in a second rotational direction opposite the first rotational direction relative to a midpoint between the pair of torsion stops 64, which corresponds to approximately a 90 degree arc between the respective torsion stops 64. When the rotation of the torsion member 70 reaches the predetermined maximum range of rotation, corresponding to wherein the stop portion 100 is contacting a respective one of the torsion stops 64, the modular vertebra segments 30 of the neck assembly 15a will then be engaged to generate a proper human like neck torsion response.

Once the immediacy of the crash impact resulting in the rotation of the torsion element 70 is finished, the low torsion of the bottom resilient member 72 will also be sufficient to bring the neck assembly 15a back to its normal orthogonal, or rest or neutral position, when external load is removed. In particular, due to the resilient nature of the bottom resilient member 72, the finger-like projections 78 function to pull the bottom resilient member 72 and coupled upper member 84 back to the normal orthogonal, or rest or neutral position, with the pins 82 remaining contained within the opening 80 and with the outer surface 83 being generally parallel with the corresponding length of the inner surface 79 of the finger-like projection 78 defining the respective opening 80.

Still further, in addition to the rotational impact, the crash test dummy 12 as provided herein is also designed to provide data regarding the frontward or rearward forces of the head assembly 14 relative to the neck assembly 15a during impact conditions.

In particular, and as noted above, the potentiometer 132 is configured to sense the rotational movement of the occipital condyle pin 130 about axis A1 during the crash test simulation as in FIG. 3B. The rotation of the occipital condyle pin 130 confirms the relative forward or rearward movement of the head assembly 14 relative to the neck assembly 15a during the crash test simulation, which is also confirmed independently from the changes in force as measured by the load cells (which can also be independently configured to measure forces of the head assembly 14 relative to the neck assembly 15a, or other portions of the crash test dummy 12 relative to the neck assembly 15a in other directions besides frontward and rearward).

The present disclosure also describes a system 1000 for creating a virtual anthropomorphic test device and evaluating the created virtual anthropomorphic test device in a virtual crash test using a software application included on a computer. The anthropomorphic test device is a virtual representation of the anthropomorphic test device described above, including all of the features and components as described above.

Figure 15:
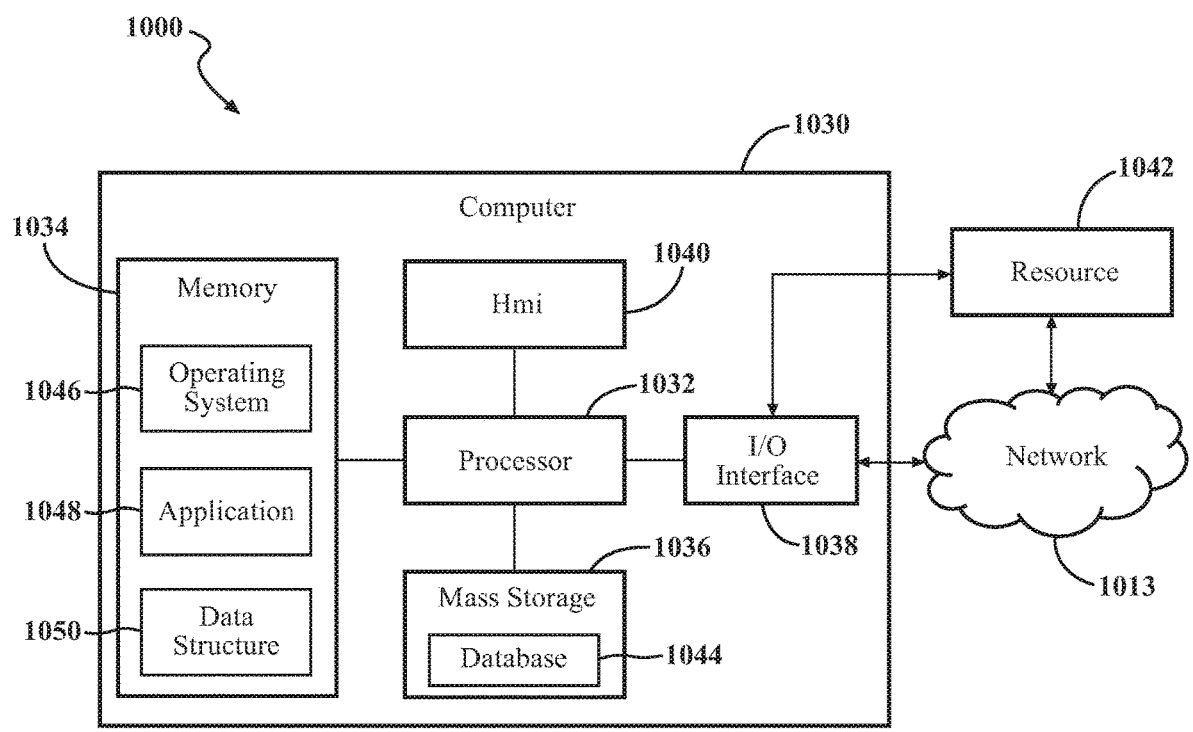
FIG. 15 is a schematic view of a system for creating and evaluating a virtual anthropomorphic test device.

Referring now to FIG. 15, the computer 1030 may include at least one processor 1032, a memory 1034, a mass storage memory device 1036, an input/output (I/O) interface 1038, and a Human Machine Interface (HMI) 1040. The computer 1030 may also be operatively coupled to one or more external resources 1042 via the network 1013 and/or I/O interface 1038. External resources may include, but are not limited to, servers, databases, mass storage devices, peripheral devices, cloud-based network services, or any other suitable computing resource that may be used by the computer 1030.

The processor 1032 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 1044 may reside on the mass storage memory device 1036 and may be used to collect and organize data used by the various systems and modules described herein.

Processor 1032 may operate under the control of an operating system 1046 that resides in memory 1034. The operating system 1046 may manage computing resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1050 may also reside in memory 1034, and may be used by the processor 1032, operating system 1046, and/or application 1048 to store or manipulate data. The software application 1048, as provided herein, includes software applications that create the virtual anthropomorphic test device 12' (also represented in FIGS. 1 and 2) and software applications that evaluate the created virtual anthropomorphic test device 12' in a virtual crash test setting.

The I/O interface 1038 may provide a machine interface that operatively couples the processor 1032 to other devices and systems, such as the network 1013 and/or external resource 1042. The application 1048 may thereby work cooperatively with the network 1013 and/or external resource 1042 by communicating via the I/O interface 1038 to provide the various features, functions, applications, processes, and/or modules comprising embodiments of the invention. The application 1048 may also have program code that is executed by one or more external resources 1042, or otherwise rely on functions and/or signals provided by other system or network components external to the computer 1030. Indeed, given the nearly endless hardware and software configurations possible, persons having ordinary skill in the art will understand that embodiments of the invention may include applications that are located externally to the computer 1030, distributed among multiple computers or other external resources 1042, or provided by computing resources (hardware and software) that are provided as a service over the network 1013, such as a cloud computing service.

The HMI 1040 may be operatively coupled to the processor 1032 of computer 1030 in a known manner to allow a user of the computer 1030 to interact directly with the computer 1030. The HMI 1040 may include video and/or alphanumeric displays, a touch screen, a speaker, and any other suitable audio and visual indicators capable of providing information to the user. The HMI 1040 may also include input devices and controls such as an alphanumeric keyboard, a pointing device, keypads, pushbuttons, control knobs, microphones, etc., capable of accepting commands or input from the user and transmitting the entered input to the processor 1032.

The neck assembly of the present invention thus can provide a more human-like response of the crash test dummy in terms of rotational and non-rotational of the head assembly relative to the neck assembly, or vice versa, during crash test simulations. This in turn allows users to design vehicles and seating systems within vehicles, for example that enhance protection of a human in such crash conditions corresponding to the crash test simulations. The present invention also allows for the evaluation, in a virtual setting, of vehicle occupant restraint systems on crash test dummies including a virtual restraint system and virtual ATD including a virtual neck assembly as provided herein.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A neck assembly for an anthropomorphic test device (ATD) comprising:
   a plurality of vertebra discs having an uppermost disc;
   a joint element disposed between each respective pair of said vertebra discs; and
   a torsion assembly comprising:
      a neck interface plate mounted to said uppermost disc with said neck interface plate having one of a plurality of spaced torsion stops and a stop portion, said neck interface plate further comprising a base region having an upper surface and an opposing lower surface adjacent to said uppermost disc;
      an upper member coupled to said neck interface plate and configured for supporting a head assembly of the ATD with said upper member rotatable from a neutral position to a turned position relative to said neck interface plate about an axis A extending through said upper member and said neck interface plate, said upper member having the other of said stop portion and said plurality of spaced apart torsion stops with said stop portion selectively engaging one of said torsion stops during an impact condition to prevent further rotation in a turned position;
      a resilient member having a plurality of projections positioned between said upper member and said neck interface plate with said plurality of projections having a radially outward end spaced from each other and with said resilient member engaging said upper member for at least partial concurrent movement during said rotation of said upper member relative to said neck interface plate from said neutral position towards said turned position wherein said plurality of projections bend in a direction responsive to a direction of rotation of said upper member relative to said neck interface plate about said axis A during said impact condition,
      wherein said upper surface of said base region includes a plurality of fasteners, with a respective one of said plurality of fasteners mounted to a respective one of said radially outward ends of one of said plurality of projections to secure a portion of said resilient member to said base region, and
      wherein each of said plurality of fasteners remains mounted to said respective one radially outward end of said plurality of projections when said plurality of projections bend from said neutral position towards said turned position in said direction responsive to said rotation of said torsion element relative to said neck interface plate about said axis A during said impact condition.

2. The neck assembly as set forth in claim 1, wherein said plurality of projections bias said upper member from said turned position towards said neutral position upon removal of said impact condition.

3. The neck assembly as set forth in claim 1, wherein said resilient member has a hub portion with said radially outward ends of said plurality of projections fixed to and disposed radially outward from said hub portion such that portions of said hub portion and said plurality of projections bend in said direction responsive to a direction of rotation of said upper member relative to said neck interface plate about said axis A during said impact condition.

4. The neck assembly as set forth in claim 3, wherein said hub portion includes a central opening, and
   wherein said upper member also has a flange member engaging said resilient member within said central opening such that said resilient member rotates with said upper member from said neutral position to said turned position during said impact condition.

5. The neck assembly as set forth in claim 1, wherein said plurality of fasteners are further defined as a plurality of pins.

6. The neck assembly as set forth in claim 1, wherein a respective pair of said plurality of spaced torsion stops limits a range of rotation of said torsion element relative to said neck interface place, wherein said range of rotation of said torsion element is up to approximately ninety (90) degrees about said axis A.

7. The neck assembly as set forth in claim 6, wherein said range of rotation of said torsion element is up to approximately forty-five (45) degrees in a first rotational direction or in a second rotational direction about said axis A relative to a midpoint between said respective pair of torsion stops.

8. The neck assembly as set forth in claim 1 further including a plurality of bearings coupled between said neck interface plate and said upper member.

9. The neck assembly as set forth in claim 1, with a projection portion extending from a center portion of said annular recessed region in a direction away from said lower surface, and wherein said neck assembly further comprises:
   a plurality of bearings disposed around said projection portion of neck interface plate; and
   a locking nut coupled to said terminal end of said projection portion of said neck interface plate to hold said plurality of bearings in an assembled state.

10. The neck assembly as set forth in claim 9, wherein said plurality of bearings comprises:
a first thrust bearing disposed around said projection portion of said neck interface plate;
a sleeve bearing disposed on said first thrust bearing; and
a second thrust bearing disposed around said projection portion and positioned and adjacent to said sleeve bearing opposite said first thrust bearing.

11. The neck assembly as set forth in claim 1, wherein a radially extending region of said upper member includes a pair of spaced apart head interface plates each including an opening respectively aligned along an axis A1, and wherein the anthropomorphic test device further comprises:
an occipital condyle pin inserted within said opening of each of said pair of head interface plates with an outer surface of said occipital condyle pin including an opening for receipt of a bolt to secure said neck assembly to the head assembly;
wherein said occipital condyle pin is configured to rotate about axis A1 in a frontward rotational direction for moving the head assembly in a forward direction relative to said neck assembly and rotate in a rearward rotational direction opposite said frontward rotational for moving the head assembly in a rearward direction.

12. The neck assembly as set forth in claim 11, wherein said upper member includes a pair of upper neck stops extending between said first and second head interface plates configured to limit movement of said head assembly forward or rearward.

13. The neck assembly as set forth in claim 11 further comprising a potentiometer fixedly coupled to one of said first head interface plates and configured to sense the rotational movement of said occipital condyle pin about axis A1.

14. An anthropomorphic test device (ATD) comprising:
a body;
a head assembly; and
a neck assembly connected to said body and to said head assembly, said neck assembly comprising:
a plurality of vertebra discs having an uppermost disc;
a joint element disposed between each respective pair of said vertebra discs; and
a torsion assembly comprising:
a neck interface plate mounted to said uppermost disc with said neck interface plate having one of a plurality of spaced torsion stops and a stop portion said neck interface plate further comprising a base region having an upper surface and an opposing lower surface adjacent to said uppermost disc;
an upper member coupled to said neck interface plate and configured for supporting a head assembly of the ATD with said upper member rotatable from a neutral position to a turned position relative to said neck interface plate about an axis A extending through said upper member and said neck interface plate, said upper member having the other one of said stop portion and said spaced torsion stops with said stop portion selectively engaging one of said torsion stops during an impact condition to prevent further rotation in a turned position;
a resilient member having a plurality of projections positioned between said upper member and said neck interface plate with each of said plurality of projections having a radially outward end and spaced from each other and said resilient member engaging said upper member for at least partial concurrent movement during said rotation of said upper member relative to said neck interface plate from said neutral position towards said turned position wherein said plurality of projections bend in a direction responsive to a direction of rotation of said upper member relative to said neck interface plate about said axis A during said impact condition,
wherein said upper surface of said base region includes a plurality of fasteners, with a respective one of said plurality of fasteners mounted to a respective one of said radially outward ends of one of said plurality of projections to secure a portion of said resilient member to said base region, and
wherein each of said plurality of fasteners remains mounted to said respective one radially outward end of said plurality of projections when said plurality of projections bend from said neutral position towards said turned position in said direction responsive to said rotation of said torsion element relative to said neck interface plate about said axis A during said impact condition.

15. The ATD as set forth in claim 14, wherein said plurality of projections bias said upper member from said turned position towards said neutral position upon removal of said impact condition.

16. The ATD as set forth in claim 14, wherein said resilient member has a hub portion with said radially outward ends of said plurality of projections fixed to and disposed radially outward from said hub portion such that portions of said hub portion and said plurality of projections bend in said direction responsive to a direction of rotation of said upper member relative to said neck interface plate about said axis A during said impact condition.

17. The ATD as set forth in claim 16, wherein said hub portion includes a central opening, and
wherein said upper member also has a flange member engaging said resilient member within said central opening such that said resilient member rotates with said upper member from said neutral position to said turned position during said impact condition.

18. The ATD as set forth in claim 14, wherein said plurality of fasteners are further defined as a plurality of pins.

19. The ATD as set forth in claim 14, wherein a respective pair of said plurality of spaced torsion stops limits a range of rotation of said torsion element relative to said neck interface place, wherein said range of rotation of said torsion element is up to approximately ninety (90) degrees about said axis A.

20. The ATD as set forth in claim 19, wherein said range of rotation of said torsion element is up to approximately forty-five (45) degrees in a first rotational direction or in a second rotational direction about said axis A relative to a midpoint between said respective pair of torsion stops.

21. The ATD as set forth in claim 14 further including a plurality of bearings coupled between said neck interface plate and said upper member.

22. The ATD as set forth in claim 14, with a projection portion extending from a center portion of said annular recessed region in a direction away from said lower surface, and wherein said neck assembly further comprises:
a plurality of bearings disposed around said projection portion of neck interface plate; and
a locking nut coupled to said terminal end of said projection portion of said neck interface plate to hold said plurality of bearings in an assembled state.

23. The ATD as set forth in claim 22, wherein said plurality of bearings comprises:
- a first thrust bearing disposed around said projection portion of said neck interface plate;
- a sleeve bearing disposed on said first thrust bearing; and
- a second thrust bearing disposed around said projection portion and positioned and adjacent to said sleeve bearing opposite said first thrust bearing.

24. The ATD as set forth in claim 14, wherein a radially extending region of said upper member includes a pair of spaced apart head interface plates each including an opening respectively aligned along an axis A1, and wherein the anthropomorphic test device further comprises:
- an occipital condyle pin inserted within said opening of each of said pair of head interface plates with an outer surface of said occipital condyle pin including an opening for receipt of a bolt to secure said neck assembly to the head assembly;
- wherein said occipital condyle pin is configured to rotate about axis A1 in a frontward rotational direction for moving the head assembly in a forward direction relative to said neck assembly and rotate in a rearward rotational direction opposite said frontward rotational for moving the head assembly in a rearward direction.

25. The ATD as set forth in claim 24, wherein said upper member includes a pair of upper neck stops extending between said first and second head interface plates configured to limit movement of said head assembly forward or rearward.

26. The ATD as set forth in claim 24 further comprising a potentiometer fixedly coupled to one of said first head interface plates and configured to sense the rotational movement of said occipital condyle pin about axis A1.

27. A system comprising:
- a computer including at least one processor, said processor including a memory; and
- a first software application stored on said memory configured to create a virtual anthropomorphic test device, said virtual anthropomorphic test device comprising:
  - a virtual body;
  - a virtual head assembly; and
  - a virtual neck assembly connected to said virtual body and to said virtual head assembly, said neck assembly comprising:
    - a plurality of virtual vertebra discs having a virtual uppermost disc;
    - a virtual joint element disposed between each respective pair of said vertebra discs; and
    - a virtual torsion assembly comprising:
      - a virtual neck interface plate mounted to said virtual uppermost disc with said virtual neck interface plate having one of a plurality of virtual spaced torsion stops and a virtual stop portion, said virtual neck interface plate further comprising a virtual base region having a virtual upper surface and an opposing virtual lower surface adjacent to said virtual uppermost disc;
      - a virtual upper member coupled to said virtual neck interface plate and configured for supporting said virtual head assembly with said virtual upper member rotatable from a neutral position to a turned position relative to said virtual neck interface plate about a virtual axis A extending through said virtual upper member and said virtual neck interface plate, said virtual upper member having the other of said virtual stop portion and said virtual spaced torsion stops with said virtual stop portion selectively engaging one of said virtual torsion stops during a virtual impact condition to prevent further rotation in a turned position;
  - a virtual resilient member having a plurality of virtual projections positioned between said virtual upper member and said virtual neck interface plate with each of said plurality of virtual projections having a virtual radially outward end spaced from each other and said virtual resilient member engaging said virtual upper member for at least partial concurrent movement during said rotation of said virtual upper member relative to said virtual neck interface plate wherein said plurality of virtual projections bend in a direction responsive to a direction of rotation of said virtual upper member relative to said virtual neck interface plate about said virtual axis A during said impact condition,
  wherein said virtual upper surface of said virtual base region includes a plurality of virtual fasteners, with a respective one of said plurality of virtual fasteners mounted to a respective one of said radially outward ends of one of said plurality of virtual projections to secure a portion of said virtual resilient member to said virtual base region, and
  wherein each of said plurality of virtual fasteners remains mounted to said respective outward end when said plurality of virtual projections bend from said neutral position towards said turned position in said direction responsive to said rotation of said virtual torsion element relative to said virtual neck interface plate about said virtual axis A during said virtual impact condition.

* * * * *